US010178381B2

(12) United States Patent
Hall et al.

(10) Patent No.: US 10,178,381 B2
(45) Date of Patent: Jan. 8, 2019

(54) DEPTH-SPATIAL FREQUENCY-RESPONSE ASSESSMENT

(71) Applicant: Microsoft Technology Licensing, LLC, Redmond, WA (US)

(72) Inventors: Michael Hall, Bellevue, WA (US); Monica Stewart, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 285 days.

(21) Appl. No.: 15/090,390

(22) Filed: Apr. 4, 2016

(65) Prior Publication Data

US 2017/0019663 A1 Jan. 19, 2017

Related U.S. Application Data

(60) Provisional application No. 62/192,279, filed on Jul. 14, 2015.

(51) Int. Cl.
| | | |
|---|---|---|
| *H04N 5/228* | (2006.01) | |
| *H04N 17/00* | (2006.01) | |
| *H04N 13/246* | (2018.01) | |
| *G06T 5/00* | (2006.01) | |
| *G06T 5/10* | (2006.01) | |
| *G06T 5/20* | (2006.01) | |

(52) U.S. Cl.
CPC ........ *H04N 17/002* (2013.01); *G06T 5/003* (2013.01); *G06T 5/10* (2013.01); *G06T 5/20* (2013.01); *H04N 13/246* (2018.05); *G06T 2200/04* (2013.01); *G06T 2207/10028* (2013.01)

(58) Field of Classification Search
CPC ...... H04N 17/002; H04N 13/246; G06T 5/20; G06T 5/003; G06T 5/10; G06T 2207/10028; G06T 2200/04
See application file for complete search history.

(56) References Cited

U.S. PATENT DOCUMENTS

| | | | |
|---|---|---|---|
| 4,575,193 | A | 3/1986 | Greivenkamp, Jr. |
| 5,600,432 | A | 2/1997 | Lengyel et al. |
| 6,229,913 | B1 | 5/2001 | Nayar et al. |

(Continued)

OTHER PUBLICATIONS

Beckett, K. et al., "MTF Characterization and Deconvolution of Rapideye Imagery", In Proceedings of the IEEE International Geoscience and Remote Sensing Symposium, Jul. 25, 2010, Honolulu, HI, USA, 4 pages.

(Continued)

*Primary Examiner* — Sinh Tran
*Assistant Examiner* — Selam T Gebriel
(74) *Attorney, Agent, or Firm* — Alleman Hall Creasman & Tuttle LLP

(57) ABSTRACT

A method to test the fidelity of a depth-imaging camera to depth-change abruptness of an imaged subject includes digitally generating, with the depth-imaging camera, a machine-readable calibration depth image of a calibration subject arranged in a field of view of the depth-imaging camera. The method includes machine processing the calibration depth image in a spatial domain to obtain a machine-readable measure of the fidelity in the spatial domain, and machine processing the measure of the fidelity in the spatial domain to obtain a measure of the fidelity in a frequency domain.

15 Claims, 10 Drawing Sheets

(56) References Cited

U.S. PATENT DOCUMENTS

| | | | |
|---|---|---|---|
| 6,628,329 | B1 | 9/2003 | Kelly et al. |
| 6,868,190 | B1 | 3/2005 | Morton |
| 8,368,751 | B2 | 2/2013 | Larkin et al. |
| 2005/0276513 | A1* | 12/2005 | Ojanen ............... G06T 7/0002 382/286 |
| 2006/0239549 | A1 | 10/2006 | Kelly et al. |
| 2007/0266287 | A1 | 11/2007 | Liu |
| 2010/0080487 | A1* | 4/2010 | Yitzhaky ............... G06T 5/003 382/266 |
| 2012/0293670 | A1 | 11/2012 | Chan et al. |
| 2013/0016222 | A1* | 1/2013 | Jiang ................. H04N 17/002 348/187 |
| 2013/0265459 | A1 | 10/2013 | Duparre et al. |
| 2014/0022441 | A1 | 1/2014 | Jenkin et al. |

OTHER PUBLICATIONS

IPEA European Patent Office, Second Written Opinion Issued in PCT Application No. PCT/US2016/039472, dated Jun. 6, 2017, WIPO, 7 Pages.

Shacham, O. et al., "Blind restoration of atmospherically degraded images by automatic best step-edge detection", Pattern Recognition Letters, vol. 28, Issue 15, Available online Jun. 28, 2007, published Sep. 20, 2007, 10 pages.

Yang, L. et al., "Remote Sensing Image Restoration using Estimated Point Spread Function", In Proceedings of the 2010 International Conference on Information, Networking and Automation (ICINA), Oct. 18, 2010, Kunming, China, 5 pages.

Klowsky, R. et al., "Modulation transfer function of patch-based stereo systems", In Proceedings of the IEEE Conference on Computer Vision and Pattern Recognition (CVPR), Jun. 16, 2012, Providence, Rhode Island, 8 pages.

Staple, B. et al., "A Range/Depth Modulation Transfer Function (RMTF) Framework for Characterizing 3D Imaging LADAR Performance", SPIE International Society for Optics and Photonics, Laser Radar Technology and Applications X, vol. 5791, May 19, 2005, 12 pages.

ISA European Patent Office, International Search Report and Written Opinion Issued in PCT Application No. PCT/US2016/039472, dated Sep. 21, 2016, WIPO, 12 pages.

"International Preliminary Report on Patentability Issued in PCT Application No. PCT/US2016/039472", dated Sep. 1, 2017, 8 Pages.

Hassebrook, Laurence G., "ECE Technical Report CSP-12-007", Retrieved on: Jun. 23, 2015 Available at: http://www.engr.uky.edu/~lgh/ecetechnicalreports/csp12007single3Dfingerprintcertiticationtests_final.pdf.

Brown, et al., "A Spatial Frequency Effect on Perceived Depth", In Journal of Perception & Psychophysics, vol. 44, Issue 2, Mar. 1988, pp. 157-166.

Reichenbach, et al., "Characterizing Digital Image Acquisition Devices", In Journal of Optical Engineering, vol. 30, Issue 2, Feb. 1991, pp. 170-177.

Gonzalez, et al., "Digital Image Processing", Third Edition. In Publication of Prentice Hall, Aug. 31, 2007, 122 pages.

Goesele, et al., "Accuracy of 3D Range Scanners by Measurement of the Slanted Edge Modulation Transfer Function", MPI Informatik. Oct. 6-10, 2003. 8 pages.

\* cited by examiner

DEPTH-SPATIAL FREQUENCY-RESPONSE ASSESSMENT

CROSS REFERENCE TO RELATED APPLICATIONS

This application claims priority to U.S. Provisional Application 62/192,279, filed Jul. 14, 2015 and entitled "DEPTH SPATIAL FREQUENCY RESPONSE ASSESSMENT", the entirety of which is hereby incorporated herein by reference, for all purposes.

BACKGROUND

Recent advances in depth-imaging technology have enabled the development of compact, low-cost depth-imaging cameras for the consumer market. These depth-imaging cameras are available in the form of stand-alone devices and components designed for integration into more complex devices and systems. Like other emerging technologies, compact depth imaging presents new and unique quality-control challenges at the point of manufacture.

SUMMARY

One aspect of this disclosure is directed to a method to test the fidelity of a depth-imaging camera to depth-change abruptness of an imaged subject. The method includes digitally generating, with the depth-imaging camera, a machine-readable calibration depth image of a calibration subject arranged in a field of view of the depth-imaging camera. The method includes machine processing the calibration depth image in a spatial domain to obtain a machine-readable measure of the fidelity in the spatial domain, and machine processing the measure of the fidelity in the spatial domain to obtain a measure of the fidelity in a frequency domain.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve the disadvantages identified in this disclosure.

DETAILED DESCRIPTION

Figure 1:
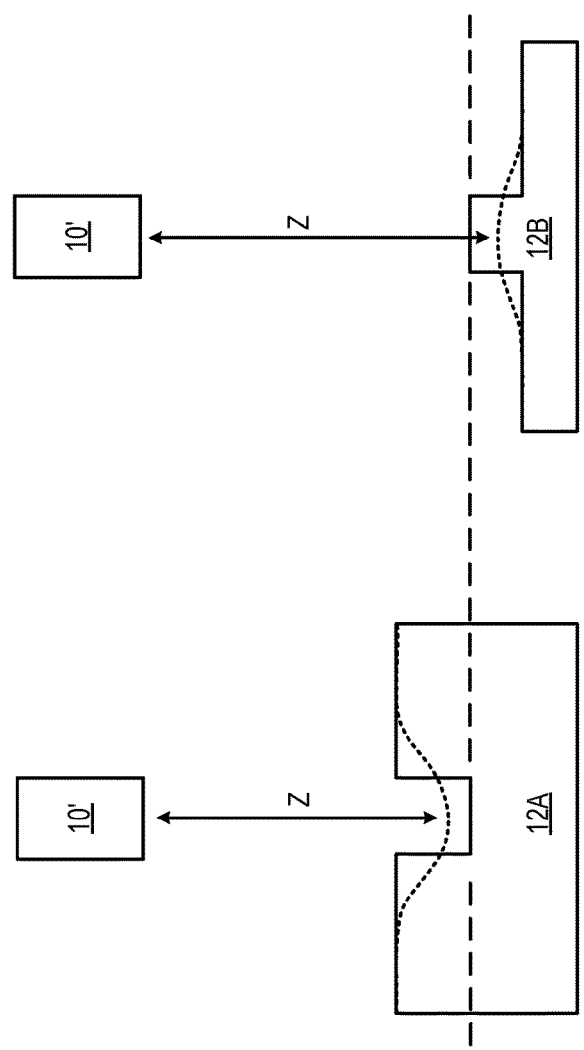
FIG. 1 shows undesirable smoothing of abrupt depth-change features of an imaged subject as reported by a depth-imaging camera.

Ideally, when a depth-imaging camera measures distance to a locus of a subject, the measured distance should not be influenced by the area surrounding the locus. Unfortunately, depth-imaging cameras often show smoothing or exaggeration of depth features. FIG. 1 shows how a depth-imaging camera 10' may react to abruptly changing depth of an imaged subject. On the left side, the dotted line shows reported depth Z to a subject 12A presenting a square trough, the reported depth being closer to the camera than the actual distance to the trough. On the right side, where the peripheral area of subject 12B is pulled away from a ridge, the camera reports a depth greater than the actual depth of the ridge. Errors of this kind degrade the quality of depth scans of abrupt contours, but are not apparent in scans of flatter targets.

As described herein, the depth-spatial frequency-response (DSFR) function of a depth imaging camera can be evaluated, used to quantify, and, in some instances, to compensate for inadequate response of a depth-imaging camera to abrupt surface contours. This approach allows different depth-imaging cameras to be compared in terms of performance in a quantified, repeatable and easily testable manner. Furthermore by measuring the DSFR function of a depth-imaging camera, the depth image of any hypothetical subject as reported by that camera can be accurately predicted (i.e., simulated).

The DSFR function is especially useful for tuning filter parameters of depth-imaging systems. Noise spatial filtering is often employed in depth-imaging cameras. Such filters tend to reduce the DSFR. Finding the right balance between noise suppression and the avoidance of feature smoothing may be challenging. With the DSFR in hand, however, the effects of noise filtering can be quickly quantified to accurately predict the result.

In previous approaches, subjective evaluation has been used to judge the ability of a depth-imaging camera to render shapes, usually with particular attention given to rendering small features. Looking at point clouds or meshes from depth-imaging cameras can give insights into performance, but such appraisals are difficult to quantify, tend to be highly subjective, and also time consuming. Another approach is minimum detectable object-size measurement. By placing in a scene an array of small targets with varying gradation in size, and capturing the scene with a depth-imaging camera, the smallest target with acceptable depth resolution can be identified. Such a system may be difficult to implement, however, and may be highly sensitive to foreground-to-background distance. Moreover, the level of acceptable depth performance must also be defined, typically in a separate measurement that adds complexity to system testing, and may involve metrics that are difficult to normalize. Yet another approach is to measure depth error in a standard scene (i.e., a test subject). If the ground truth depth of the standard scene is known, it can be compared to the depth reported by the depth-imaging camera. The standard scene might consist of a still life, a person in a standard pose, or a residential interior. Errors can be measured, and, if the scene has any complexity, the effects of DSFR will be manifest in the computed error. However, getting the ground truth for the scene and correctly orienting this ground truth in relation to the depths measured by the tested camera may be challenging. Scenes will likely be very difficult to reproduce, so correlating the results of different assays may be non-trivial.

The technologies here disclosed address the foregoing issues and provide additional advantages. Before presenting detailed methods for DSFR testing and depth-imaging calibration, an example depth-imaging camera will first be described.

Figure 2:
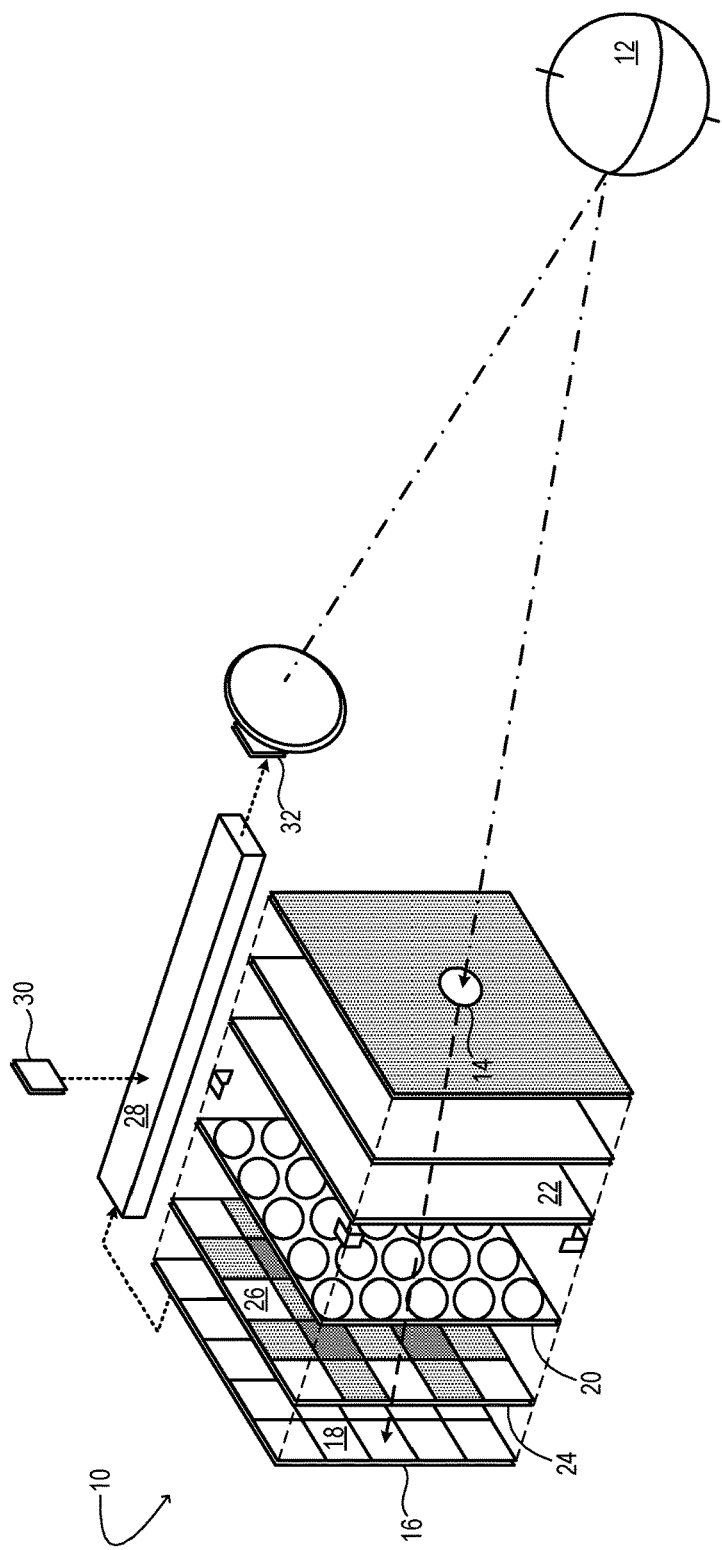
FIG. 2 shows, in an exploded view, aspects of an example depth-imaging camera.

The exploded view of FIG. 2 shows aspects of an example depth-imaging camera 10. A depth-imaging camera may be configured to acquire one or more depth images of a scene or subject 12. The term 'depth image' refers herein to an array of pixel coordinates registered to corresponding regions ($X_i$, $Y_i$) of an imaged scene; a depth value $Z_i$ indicates, for each pixel coordinate, the depth of the corresponding region. 'Depth' is defined herein as a coordinate that increases with increasing distance from the camera, in a direction parallel to the optical axis of the camera. 'Depth video' refers herein to a time-resolved sequence of depth images.

Configured to image a scene or subject 12, depth-imaging camera 10 includes at least one aperture 14 and a sensor array 16. The sensor array is a two-dimensional matrix of light-sensing pixel elements 18. In some implementations, the pixel elements may be complementary metal-oxide semiconductor (CMOS) elements, but other semiconductor architectures are envisaged as well. Each pixel element is intrinsically responsive to light over a broad wavelength band. For silicon-based pixel elements, the wavelength response may range from 300 to 1200 nm. Microlens array 20 is optionally arranged over sensor array 16 to provide a larger acceptance cone at each of the pixel elements, for increased collection efficiency.

Due to the broad wavelength response of pixel elements 18, depth-imaging camera 10 may include one or more passive filters 22 in series with sensor array 16 and configured to limit the wavelength response of the sensor array. The passive filters reduce noise by excluding photons of wavelengths not intended to be imaged. Typically, an IR-imaging camera may include a visible bandstop filter. In implementations in which both visible and IR response is desired, the one or more passive filters may include a visible and narrow-band IR bandpass filter. If configured for visible as well as IR imaging, the depth-imaging camera may also include a color filter array (CFA) 24 of color filter elements 26. The color filter elements may be arranged in registry with the pixel elements of the sensor array. An example CFA may present a Bayer pattern—i.e., a repeated tiling of 2×2 subarrays having two green-transmissive elements, one blue-transmissive element, and one red-transmissive element in each subarray, for example. In this implementation, the integrated response from the sensor array may be converted into a full-color image using a de-mosaicing algorithm. In implementations in which both visible and IR response is required at each pixel element, all of the color filter elements may be highly transmissive in the IR band of interest.

Depth-imaging camera 10 includes electronic controller 28. The electronic controller may include a microprocessor and associated electronic memory. The electronic memory may hold instructions that cause the microprocessor to enact any operation, algorithm, computation, or transformation disclosed herein. In some implementations, the microprocessor may take the form of an application-specific integrated circuit (ASIC) or system-on-a-chip (SoC), in which some or all of the instructions are hardware- or firmware-encoded. In the illustrated example, the electronic controller is operatively coupled to temperature sensor 30. Additional aspects of the electronic controller are described hereinafter.

Depth-imaging camera 10 includes IR emitter 32, such as one or more IR light-emitting diodes (LEDs) or an IR laser. Electronic controller 28 is configured to modulate the IR emitter and synchronously address pixel elements 18. The term 'modulate' as applied to IR emitter 32 may include activating or deactivating the IR emitter, and, in some implementations, periodically varying the intensity of the IR emission at a high frequency (e.g., 100 MHz). The term 'address' as applied to pixel elements 18 may have a somewhat different meaning depending on the imaging mode described. For flat-imaging-both visible and IR-addressing the pixel elements may include integrating the intensity of light received at each pixel element 18 and associating the integrated intensity with the portion of the image corresponding to that element. For depth imaging, the pixel elements may be addressed differently. Here, addressing the pixel elements may include resolving a phase offset of each pixel element relative to the periodic modulation of the IR emitter. In some implementations, the phase offset of each pixel element may be converted into a pixel-resolved time-of-flight (ToF) of the pulsed illumination-viz., from the illumination source to the locus of the subject imaged at that pixel element and then back to the sensor array. ToF data may be converted into a depth coordinate by logic of depth-imaging camera 10 and inserted into a depth image of acquired subject 12. In some implementations, a series of IR acquisitions in rapid succession may be used to obtain the phase offset. In combination depth- and flat-imaging applications, both of the above addressing modes may be used in an alternating (i.e., multiplexed) manner.

The phase-discriminating ToF camera described above is one of several implementations envisaged herein. Other ToF configurations may have two or more pixel elements imaging the same locus of the subject. Each pixel element may include one or more finger gates, transfer gates and/or collection nodes epitaxially formed on a semiconductor substrate. The pixel elements associated with each locus may be addressed so as to provide two or more integration periods synchronized to the pulsed emission from the radiant energy source. The integration periods may differ in phase and/or total integration time. Based on the relative amount of charge accumulated on the pixel elements during the different integration periods, the distance out to the reflecting locus of the subject may be obtained. For example, the radiant energy source and a first pixel element may be energized synchronously, while a second pixel element is energized 180° out of phase with respect to the first pixel element.

In other implementations, brightness or color data from two, stereoscopically oriented sensor arrays may be co-registered and used to construct a depth image. More generally, depth coordinates into a scene may be obtained using one or more flat-imaging cameras, with optical-tomography based co-registration of imaged features. Hyperspectral (e.g., visible+IR and/or UV) flat imaging may be used with this approach, for improved feature discrimination. In other examples, an IR illumination source associated with a depth-imaging camera may be configured to project onto the subject a structured illumination pattern comprising numerous discrete features—e.g., lines or dots. A sensor array in the depth-imaging camera may be configured to image the structured illumination reflected back from the subject. Based on the spacings between adjacent features in the various regions of the imaged subject, a depth image of the subject may be constructed.

Figure 3:
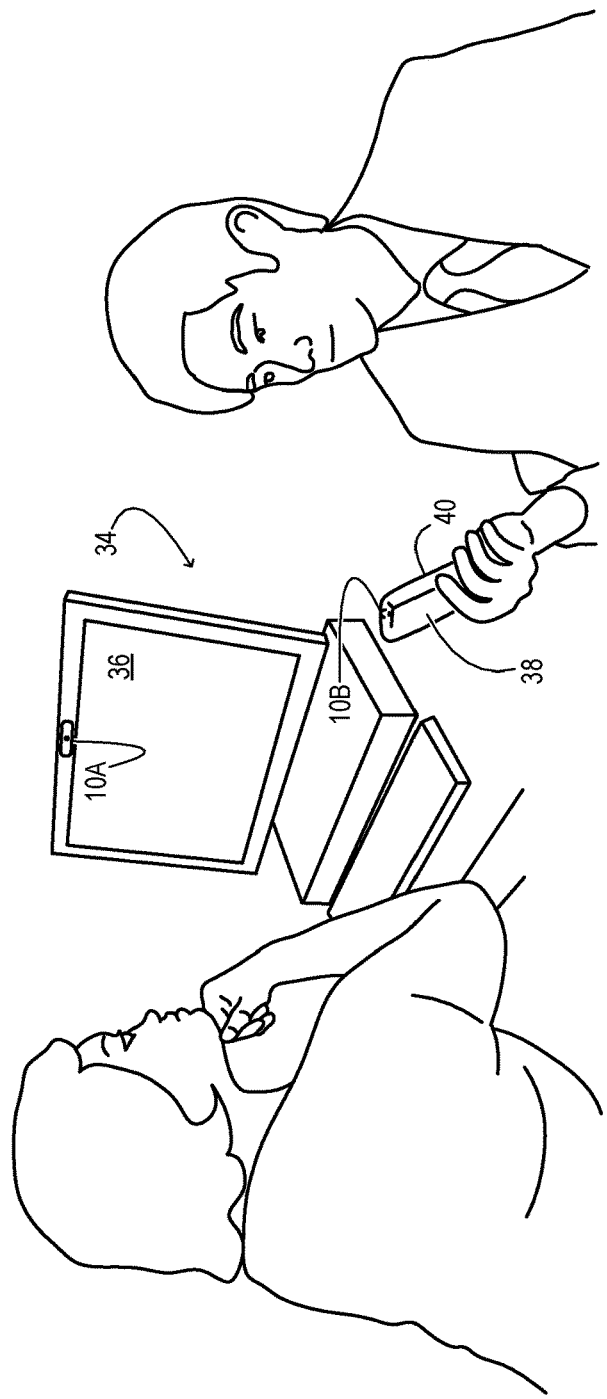
FIG. 3 shows aspects of an example desktop computer system and smartphone.
Figure 4:
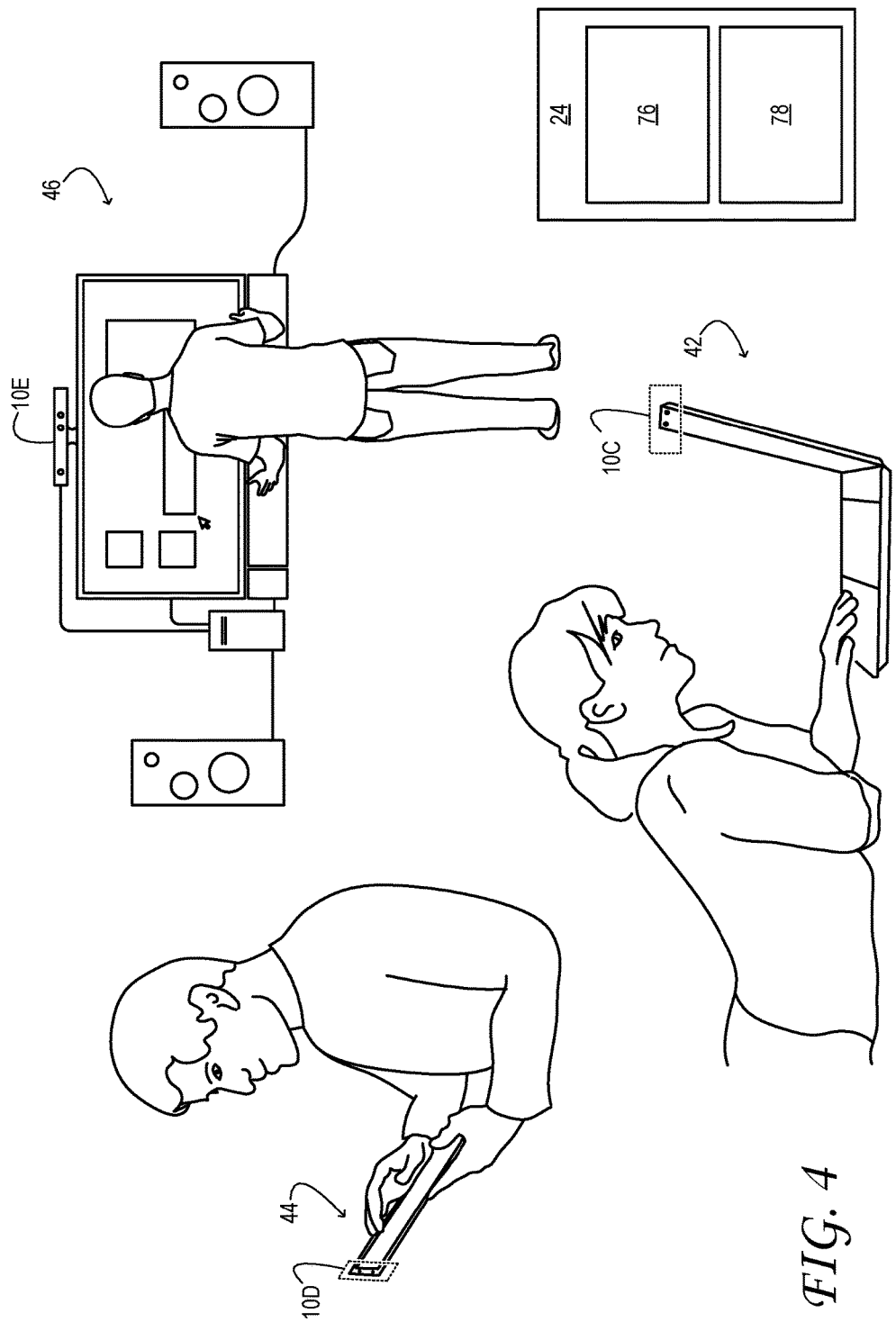
FIG. 4 shows aspects of an example laptop computer system, tablet computer system, and home-theatre system.
Figure 5:
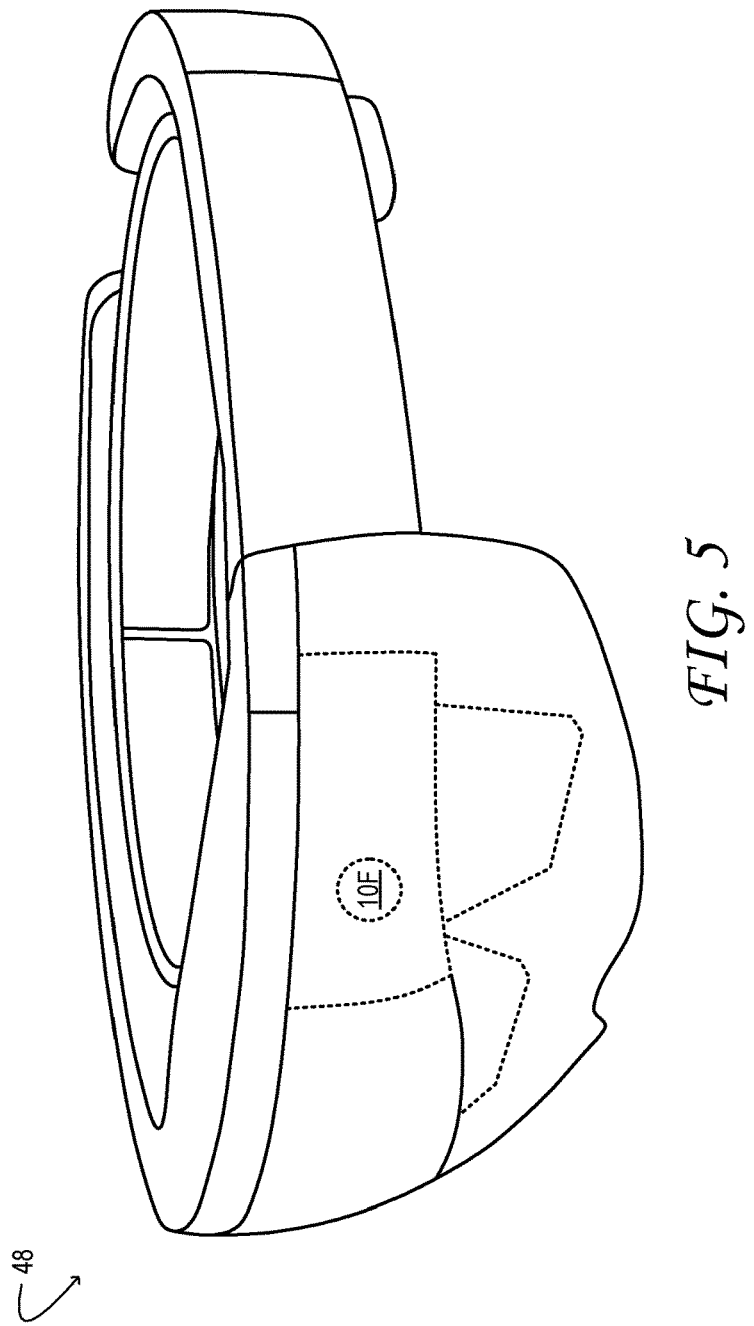
FIG. 5 shows aspects of a head-mounted augmented-reality display system.

As noted hereinabove, a depth-imaging camera may be integrated into a more complex device or system. FIGS. 3, 4, and 5 show various devices having an integrated depth-imaging camera. FIG. 3 shows a desktop computer system 34 with a depth-imaging camera 10A built into monitor 36 of the computer system. FIG. 3 also shows a smartphone 38 with a depth-imaging camera 10B arranged behind display bezel 40. FIG. 4 shows a laptop computer system 42 and integrated depth-imaging camera 10C, a tablet computer system 44 and integrated depth-imaging camera 10D, and a home-theatre system 46 with peripheral depth-imaging camera 10E. FIG. 5 shows a head-mounted augmented-reality display system 48 having an integrated depth-imaging camera 10F.

Figure 6:
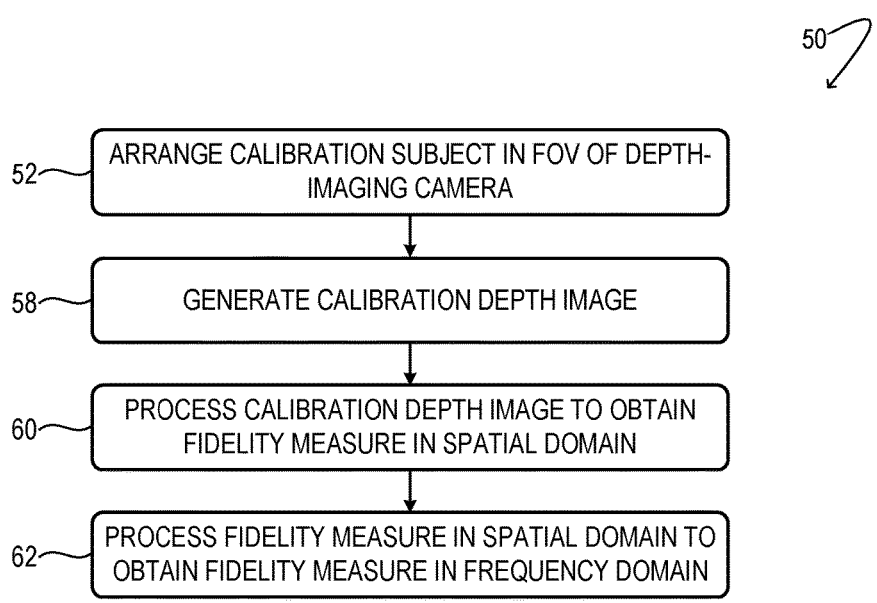
FIG. 6 illustrates aspects of an example method to test the fidelity of a depth-imaging camera to depth-change abruptness of an imaged subject.
Figure 7:
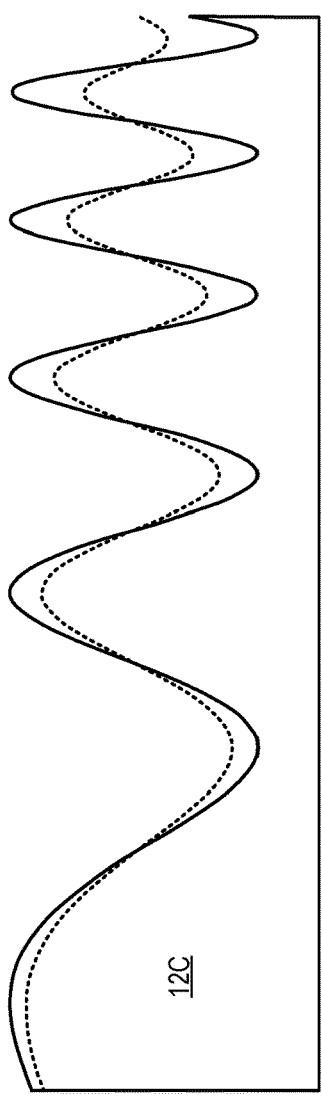
FIGS. 7 and 8 show example calibration subjects for testing a depth-imaging camera.

FIG. 6 illustrates aspects of an example method 50 to test the fidelity of a depth-imaging camera to depth-change abruptness of an imaged subject. At 52 of method 50, a calibration subject is arranged in a field of view of the depth-imaging camera. FIG. 7 shows, for purpose of illustration, a portion of one possible calibration subject that could be used. The illustrated calibration subject 12C presents a sinusoidal wave pattern, with wavelets of varying frequency. By analyzing depth reported for this subject, the DFSR function of depth-imaging camera 10 could be measured. In the example of FIG. 7, the response (indicated by the broken line) becomes weaker with increasing spatial frequency. The frequency can be normalized to units such as cycles per pixel, or cycles per radian, as desired. The response can be measured in terms of the amplitude of the reported sine wave in the depth image compared to the ground truth. However, the particular calibration subject shown in FIG. 7 is difficult to manufacture and somewhat limited in utility, because the frequency is strongly correlated with distance across the FOV.

Figure 8:
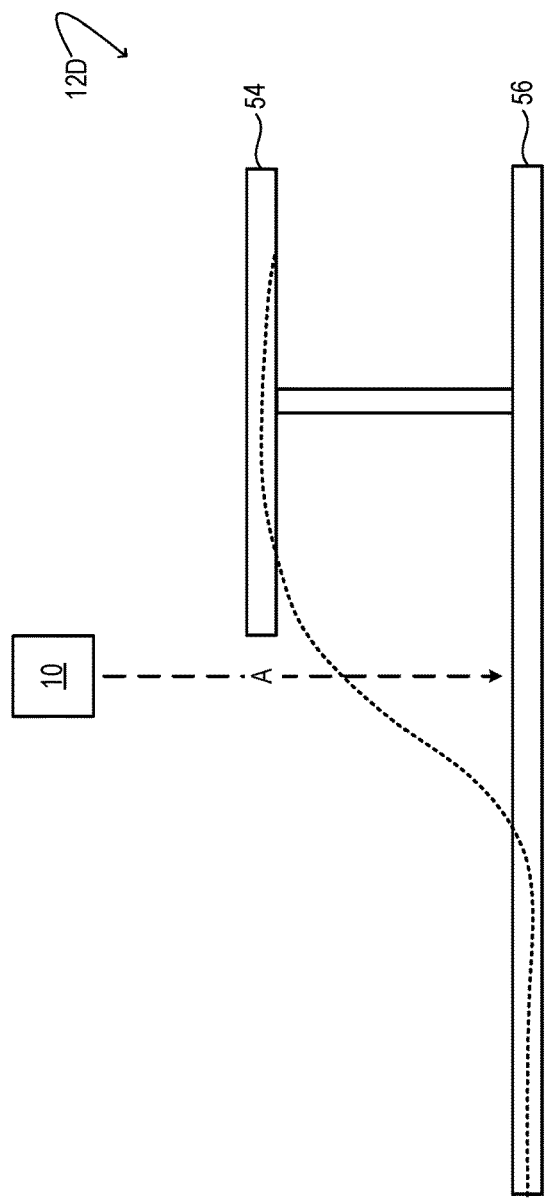

FIG. 8 shows a portion of another calibration subject 12D. Calibration subject 12D presents an abruptly changing depth profile in the FOV of the depth-imaging camera. Having a foreground target portion 54 arranged in front of a background target portion 56, the abruptly changing depth profile of calibration subject 12D is discontinuous. Further, the abruptly changing depth profile is asymmetric upon rotation of the calibration subject about optical axis A of depth-imaging camera 10.

Returning now to FIG. 6, at 58 of method 50, a machine-readable calibration depth image of the calibration subject is digitally generated (i.e., acquired) by the depth-imaging camera. At 60 the calibration depth image is machine processed in the spatial (e.g., X-Y) domain to obtain a machine-readable measure of the fidelity in the spatial domain. In some examples, the measure of the fidelity in the spatial domain may include an edge-spread function of the calibration depth image. At 62 the measure of the fidelity in the spatial domain is machine processed to obtain a measure of the fidelity in a frequency domain. In some examples, processing the measure of the fidelity in the spatial domain includes, as an initial step, differentiating the edge-spread function to obtain a line-spread function of the calibration depth image. Then, a Fourier transform of the line-spread function is computed to obtain the DSFR function.

Figure 9:
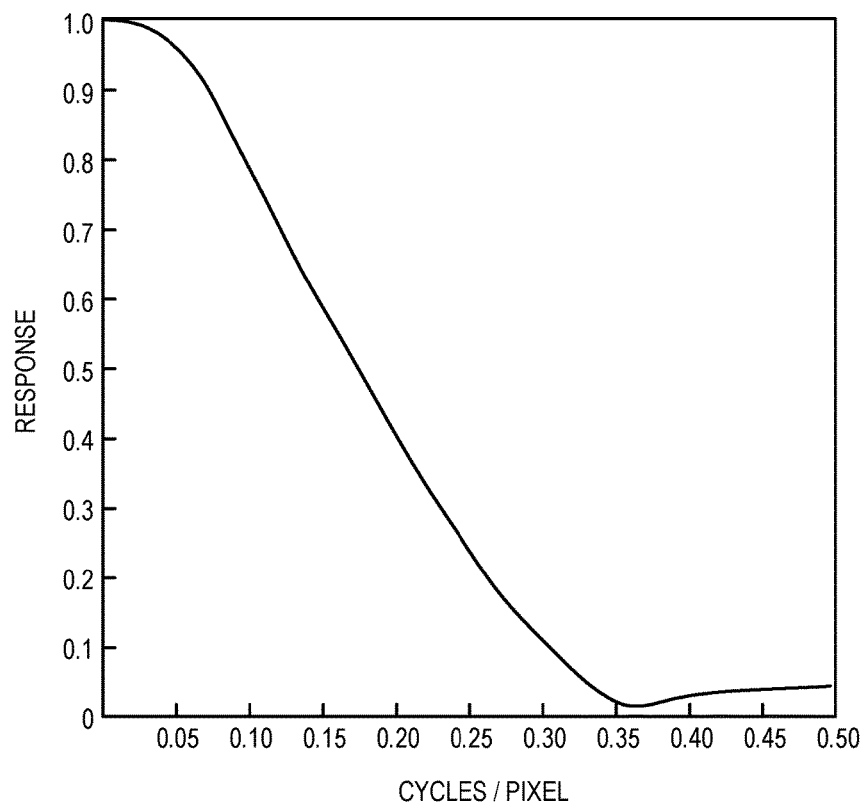
FIG. 9 is a plot of an example depth-spatial frequency-response function of a depth-imaging camera.

A plot of an example DSFR function is shown in FIG. 9. The function approaches unity at low spatial frequencies and approaches zero at high frequencies. Any scene with a suitably abrupt depth-change profile is amenable DSFR computation according to method 50. With this in mind, suitable calibration subjects need not be limited to targets arranged in a laboratory, but may include real world scenes and subjects not originally intended for testing purposes. Moreover, direct side-by-side comparison of the DSFR among different depth-imaging systems does not require the same calibration subject to be used for each system.

In implementations in which the abruptly changing depth profile is asymmetric upon rotation of the calibration subject about an optical axis of the depth-imaging camera, the act of processing the measure of the fidelity (62 in method 50) may include obtaining a measure of anisotropy of the fidelity in the frequency domain. One example measure of anisotropy is the dependence of the DFSR on the angle of rotation about the optical axis.

In some examples, the depth-imaging camera and the calibration subject may be in relative motion during acquisition of the calibration depth image. Here, the measure of the fidelity in the frequency domain may be a convolution of static fidelity to the depth-change abruptness and motion blur caused by the relative motion. If more data is available to the system, deconvolution of these components is possible. Accordingly, depth-imaging systems with access to pose data, and hence motion data, could apply deconvolution to compensate for motion blur.

In one example, motion compensation is applied to an image of a subject in constant planar motion captured at shutter time T. The image can be modeled as $$g(x,y) = \int_0^T f[x-x_0(t), y-y_0(t)]dt,$$

where g is the blurred image, f is the unblurred image, and $x_0(t), y_0(t)$ define the motion as functions of the time t.

The associated Fourier transform H is $$H(u,v) = \int_0^T e^{-j2\pi[ux_0(t)+vy_0(t)]} dt$$

This Fourier transform defines the motion blur, which can now be applied in deconvolution. In practice, processes such as Wiener filtering may be used for deconvolution. Estimates for $x_0(t), y_0(t)$ are readily available via inertial and other motion-sensing componentry coupled to the depth-imaging system.

The DSFR function computed in method 50 predicts the detailed frequency response of the depth-imaging camera being tested. Accordingly, it can be applied as a filter to a synthetically generated depth scene, in order to predict the output of the depth-imaging camera. Conversely, it may be the case that a depth-imaging camera has been designed already, and the DSFR predicted by analysis of the optics, mechanics, and software of the system. This can be applied, in turn, to a synthetic scene to allow the designer to see a simulation of depth-imaging performance.

Figure 10:
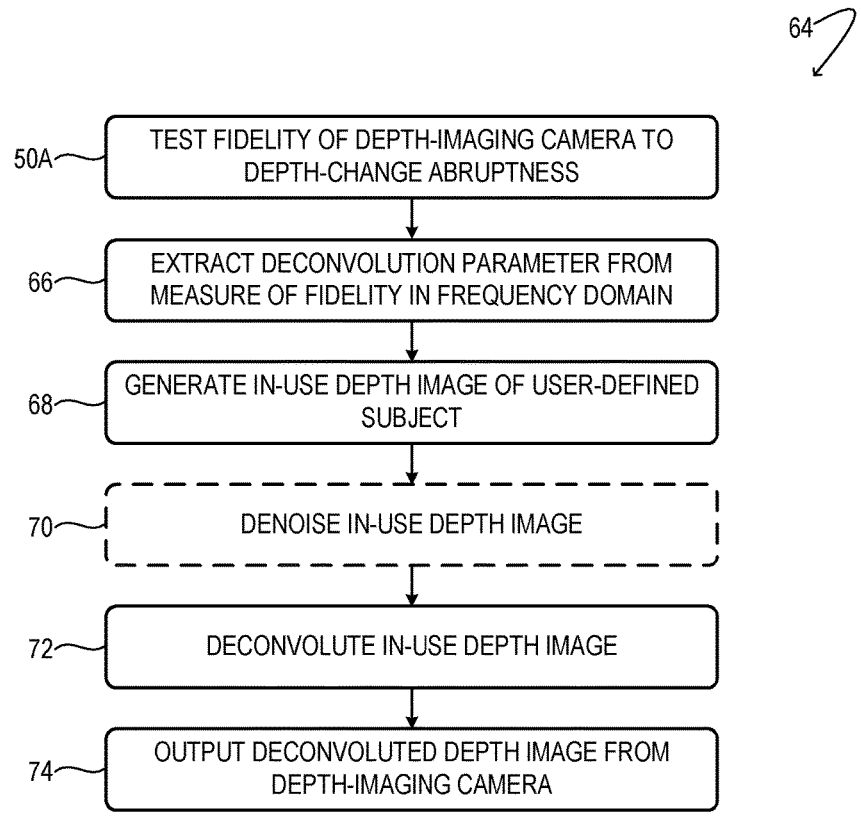
FIG. 10 illustrates aspects of an example method to calibrate a depth-imaging camera to improve fidelity to depth-change abruptness of an imaged subject.

FIG. 10 illustrates aspects of an example method 64 to calibrate a depth-imaging camera to improve fidelity to depth-change abruptness of an imaged subject. At 50A of method 64, the fidelity of the depth-imaging camera to the depth-change abruptness is tested. In some examples, such testing may be enacted as described above, in the context of FIG. 6.

At 66 of method 64, a deconvolution parameter value is extracted from the measure of the fidelity in the frequency domain (e.g., the DSFR function). The deconvolution parameter may correspond to 'cutoff' frequency of the DSFR function—e.g., the frequency at which the normalized response is decreased to 0.5, or to 1/e, etc. More complex deconvolution parameters and parameter sets are also envisaged. At 68 an in-use depth image of a user-defined subject is digitally generated (i.e., acquired) by the depth-imaging camera. At 70 the in-use depth image is optionally denoised in logic of the depth-imaging camera. Any suitable denoising filter algorithm may be used. The extent of the denoising may be defined by one or more denoising parameter values.

At 72 the in-use depth image is deconvoluted based on the deconvolution parameter value, also in logic of the depth-imaging camera. In some examples, deconvoluting the in-use depth image includes direct inverse filtering and/or Wiener filtering in an amount to compensate for smoothing resulting from DSFR less than 1. Thus, deconvoluting the in-use depth image may include increasing the depth-change abruptness of a locus of the in-use depth image.

In some examples, the computed depth at each pixel coordinate of a depth image may be a composite based on addressing a corresponding pixel element two or more times. Here, deconvolution at 72 of method 64 may be applied each of the two or more times that the pixel element is addressed. For example, addressing each pixel element two or more times may include addressing at two or more different modulation frequencies of IR emitter 32. A ToF phase-based depth-imaging camera, more specifically, may use data acquired at several different frequencies and phase delays, which produce plural streams of 2D data, which are combined algorithmically to yield a final depth image. Deconvolution may be applied, accordingly, to these streams before conversion into depth data. Alternatively, the deconvolution may be applied to the composite depth image. Then, at 74 of method 64, a deconvoluted machine-readable depth image is output from the depth-imaging camera. Output may include display or wired or wireless transfer to another device.

In some examples, the process described above—from acquisition of the calibration depth image to Fourier transform of the line-spread function, where appropriate—may be controlled by manufacturing hardware at the point of production of the depth-imaging camera. In some examples, some or all aspects of the process may be controlled by the electronic controller of the depth-imaging camera itself. For example, instructions to acquire the calibration depth image, take the derivative, and/or compute the Fourier transform may be burned into firmware of the electronic controller. In these and other examples, the electronic controller may include logic configured to deconvolute (i.e., deconvolve) an in-use depth image based on a deconvolution parameter stored in the electronic memory, the deconvolution parameter extracted from a machine-readable measure of the fidelity to the depth-change abruptness in a frequency domain obtained by processing a machine-readable measure of the fidelity in a spatial domain, the measure of the fidelity in the spatial domain obtained by processing a calibration depth image in the spatial domain.

No aspect of the foregoing methods should be understood in a limiting sense, for numerous variations and extensions are contemplated as well. In some examples testing step 50 and extracting step 66 may be repeated for each of a plurality of denoising-filter parameter values, yielding a corresponding plurality of deconvolution parameter values. In such examples, method 64 may further comprise, at 72, selecting from among the deconvolution parameter values based on an amount of denoising applied to the in-use depth image. Aggressive denoising may be applied to depth-images acquired under high ambient brightness (e.g., outdoors), and minimal denoising applied elsewhere. Likewise, in some examples testing step 50 and extracting step 66 may be repeated for each of a plurality of temperatures, yielding a corresponding plurality of deconvolution parameter values. In such examples, method 64 may further comprise, at 72, selecting from among the deconvolution parameter values based on temperature measured during acquisition of the in-use depth image. By inference, the DSFR function of various depth-imaging cameras is apt to change with temperature. If the system temperature is known in real time—by reading an onboard temperature sensor, for example—then the amount of deconvolution applied can be adjusted as the system warms and cools.

Aspects of this disclosure are described by example, and with reference to the attached drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic not necessarily drawn to scale. Rather, the various drawing scales, aspect ratios, and numbers of components shown in the figures may be purposely distorted to make certain features or relationships easier to see.

The methods and processes described herein may be tied to a computing system of one or more computing devices. In particular, such methods and processes may be implemented as a computer-application program or service, an application-programming interface (API), a library, and/or other computer-program product.

FIG. 4 schematically shows a non-limiting embodiment of a computing system in the form of electronic controller 24 that can enact one or more of the methods and processes described above. The computing system is shown in simplified form. The computing system may take the form of one or more personal computers, server computers, tablet computers, home-entertainment computers, network computing devices, gaming devices, mobile computing devices, mobile communication devices (e.g., smart phone), and/or other computing devices.

The computing system includes a logic machine 76 and a electronic memory machine 78. The computing system may optionally include a display subsystem, an input subsystem, a communication subsystem, and/or other components not shown in FIG. 4.

Logic machine 76 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Electronic memory machine 78 includes one or more physical devices configured to hold instructions executable by the logic machine to implement the methods and processes described herein. When such methods and processes are implemented, the state of electronic memory machine 78 may be transformed—e.g., to hold different data.

Electronic memory machine 78 may include removable and/or built-in devices. Electronic memory machine 78 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Electronic memory machine 78 may include volatile, nonvolatile, dynamic, static, read/write, read-only, random-access, sequential-access, location-addressable, file-addressable, and/or content-addressable devices.

It will be appreciated that electronic memory machine 78 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 76 and electronic memory machine 78 may be integrated together into one or more hardware-logic components. Such hardware-logic components may include field-programmable gate arrays (FPGAs), program- and application-specific integrated circuits (PA-SIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of the computing system implemented to perform a particular function. In some cases, a module, program, or engine may be instantiated via logic machine 76 executing instructions held by electronic memory machine 78. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, a display subsystem may be used to present a visual representation of data held by electronic memory machine 78. This visual representation may take the form of a graphical user interface (GUI). As the herein described methods and processes change the data held by the electronic memory machine, and thus transform the state of the electronic memory machine, the state of the display subsystem may likewise be transformed to visually represent changes in the underlying data. The display subsystem may include one or more display devices utilizing virtually any type of technology. Such display devices may be combined with logic machine 76 and/or electronic memory machine 78 in a shared enclosure, or such display devices may be peripheral display devices.

When included, an input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, a communication subsystem may be configured to communicatively couple the computing system with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow the computing system to send and/or receive messages to and/or from other devices via a network such as the Internet.

One aspect of this disclosure is directed to a method to test fidelity of a depth-imaging camera to depth-change abruptness of an imaged subject, the method comprising: digitally generating, with the depth-imaging camera, a machine-readable calibration depth image of a calibration subject arranged in a field of view of the depth-imaging camera; machine processing the calibration depth image in a spatial domain to obtain a machine-readable measure of the fidelity in the spatial domain; and machine processing the measure of the fidelity in the spatial domain to obtain a measure of the fidelity in a frequency domain.

In some implementations, the calibration subject presents an abruptly changing depth profile in a field of view of the depth-imaging camera. In some implementations, the abruptly changing depth profile is a discontinuous depth profile. In some implementations, the abruptly changing depth profile is asymmetric upon rotation of the calibration subject about an optical axis of the depth-imaging camera, and processing the measure of the fidelity includes obtaining a measure of anisotropy of the fidelity in the frequency domain. In some implementations, the depth-imaging camera and the calibration subject are in relative motion during acquisition of the calibration depth image, and the measure of the fidelity in the frequency domain is a convolution of static fidelity to the depth-change abruptness and motion blur caused by the relative motion.

Another aspect of this disclosure is directed to a method to calibrate a depth-imaging camera to improve fidelity to depth-change abruptness of an imaged subject, the method the comprising: digitally generating, with the depth-imaging camera, a machine-readable calibration depth image of a calibration subject arranged in a field of view of the depth-imaging camera; machine processing the calibration depth image in a spatial domain to obtain a machine-readable measure of the fidelity in the spatial domain; machine processing the measure of the fidelity in the spatial domain to obtain a machine-readable measure of the fidelity in a frequency domain; extracting a deconvolution parameter value from the measure of the fidelity in the frequency domain; digitally generating, with the depth-imaging camera, an in-use depth image of a user-defined subject; and in logic of the depth-imaging camera, deconvoluting the in-use depth image based on the deconvolution parameter value.

Some implementations of the method further comprise outputting, from the depth-imaging camera, a deconvoluted machine-readable depth image. In some implementations, the measure of the fidelity in the spatial domain includes an edge-spread function of the calibration depth image. In some implementations, processing the measure of the fidelity in the spatial domain includes differentiating the edge-spread function to obtain a line-spread function of the calibration depth image. In some implementations, processing the measure of the fidelity in the spatial domain includes computing a Fourier transform of the line-spread function to obtain a depth-spatial frequency response (DSFR) function. In some implementations, deconvoluting the in-use depth image includes direct inverse filtering and/or Wiener filtering in an amount to compensate for the DSFR function. In some implementations, deconvoluting the in-use depth image includes increasing the depth-change abruptness of a locus of the in-use depth image. Some implementations of the method further comprise denoising the in-use depth image in logic of the depth-imaging camera prior to deconvoluting the in-use depth image. In some implementations, said processing and extracting are repeated for each of a plurality of denoising-filter parameter values, yielding a corresponding plurality of deconvolution parameter values, the method further comprising selecting from among the deconvolution parameter values based on an amount of denoising applied to the in-use depth image. In some implementations, said processing and extracting are repeated for each of a plurality of temperatures, yielding a corresponding plurality of deconvolution parameter values, the method further comprising selecting from among the deconvolution parameter values based on temperature measured during acquisition of the in-use depth image.

Another aspect of this disclosure is directed to a depth-imaging camera calibrated to improve fidelity to depth-change abruptness of an imaged subject, the camera comprising: an array of light-sensing pixel elements; electronic memory; logic configured to address each of the pixel elements, and, for each pixel element addressed, to compute depth to a subject locus imaged on that pixel element, and to generate an in-use depth image including the computed depth for each pixel element; and logic configured to deconvolute the in-use depth image based on a deconvolution parameter stored in the electronic memory, the deconvolution parameter extracted from a machine-readable measure of the fidelity to the depth-change abruptness in a frequency domain obtained by processing a machine-readable measure of the fidelity in a spatial domain, the measure of the fidelity in the spatial domain obtained by processing a calibration depth image in the spatial domain.

In some implementations, the computed depth is a composite based on addressing each pixel element two or more times, and wherein the logic configured to deconvolute the in-use depth image applies deconvolution for each of the two or more times that the pixel element is addressed. Some implementations further comprise a modulated IR emitter, wherein addressing each pixel element two or more times includes addressing at two or more different modulation frequencies of the IR emitter. In some implementations, the computed depth is a composite based on addressing each pixel element two or more times, and the logic configured to deconvolute the in-use depth image applies deconvolution to the composite. Some implementations further comprise a temperature sensor, wherein a different deconvolution parameter value is stored in the electronic memory for each of a plurality of temperatures, and wherein the logic is further configured to select the deconvolution parameter value based on a reading of the temperature sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method to calibrate a depth-imaging camera to improve fidelity to depth-change abruptness of an imaged subject, the method the comprising:
   digitally generating, with the depth-imaging camera, a machine-readable calibration depth image of a calibration subject arranged in a field of view of the depth-imaging camera;
   machine processing the calibration depth image in a spatial domain to obtain a machine-readable measure of the fidelity in the spatial domain;
   machine processing the measure of the fidelity in the spatial domain to obtain a machine-readable measure of the fidelity in a frequency domain;
   extracting a deconvolution parameter value from the measure of the fidelity in the frequency domain;
   digitally generating, with the depth-imaging camera, an in-use depth image of a user-defined subject; and
   in logic of the depth-imaging camera, deconvoluting the in-use depth image based on the deconvolution parameter value.

2. The method of claim 1 further comprising outputting, from the depth-imaging camera, a deconvoluted machine-readable depth image.

3. The method of claim 1 wherein the measure of the fidelity in the spatial domain includes an edge-spread function of the calibration depth image.

4. The method of claim 3 wherein processing the measure of the fidelity in the spatial domain includes differentiating the edge-spread function to obtain a line-spread function of the calibration depth image.

5. The method of claim 4 wherein processing the measure of the fidelity in the spatial domain includes computing a Fourier transform of the line-spread function to obtain a depth-spatial frequency response (DSFR) function.

6. The method of claim 5 wherein deconvoluting the in-use depth image includes direct inverse filtering and/or Wiener filtering in an amount to compensate for the DSFR function.

7. The method of claim 1 wherein deconvoluting the in-use depth image includes increasing the depth-change abruptness of a locus of the in-use depth image.

8. The method of claim 1 further comprising denoising the in-use depth image in logic of the depth-imaging camera prior to deconvoluting the in-use depth image.

9. The method of claim 8 wherein said processing and extracting are repeated for each of a plurality of denoising-filter parameter values, yielding a corresponding plurality of deconvolution parameter values, the method further comprising selecting from among the deconvolution parameter values based on an amount of denoising applied to the in-use depth image.

10. The method of claim 1 wherein said processing and extracting are repeated for each of a plurality of temperatures, yielding a corresponding plurality of deconvolution parameter values, the method further comprising selecting from among the deconvolution parameter values based on temperature measured during acquisition of the in-use depth image.

11. A depth-imaging camera calibrated to improve fidelity to depth-change abruptness of an imaged subject, the depth-imaging camera comprising:
- an array of light-sensing pixel elements;
- electronic memory;
- logic configured to address each of the pixel elements, and, for each pixel element addressed, to compute depth to a subject locus imaged on that pixel element, and to generate an in-use depth image including the computed depth for each pixel element; and
- logic configured to deconvolute the in-use depth image based on a deconvolution parameter stored in the electronic memory, the deconvolution parameter extracted from a machine-readable measure of the fidelity to the depth-change abruptness in a frequency domain obtained by processing a machine-readable measure of the fidelity in a spatial domain, the measure of the fidelity in the spatial domain obtained by processing a calibration depth image in the spatial domain.

12. The depth-imaging camera of claim 11 wherein the computed depth is a composite based on addressing each pixel element two or more times, and wherein the logic configured to deconvolute the in-use depth image applies deconvolution for each of the two or more times that the pixel element is addressed.

13. The depth-imaging camera of claim 12 further comprising a modulated IR emitter, wherein addressing each pixel element two or more times includes addressing at two or more different modulation frequencies of the IR emitter.

14. The depth-imaging camera of claim 12 wherein the computed depth is a composite based on addressing each pixel element two or more times and wherein the logic configured to deconvolute the in-use depth image applies deconvolution to the composite.

15. The depth-imaging camera of claim 11 further comprising a temperature sensor,
- wherein a different deconvolution parameter value is stored in the electronic memory for each of a plurality of temperatures, and wherein the logic configured to deconvolute the in-use depth image is further configured to select the deconvolution parameter value based on a reading of the temperature sensor.

* * * * *